United States Patent
Schultz (10) Patent No.: US 7,196,260 B2
(45) Date of Patent: Mar. 27, 2007

(54) ENTRY OF MUSICAL DATA IN A MOBILE COMMUNICATION DEVICE

(75) Inventor: Charles P. Schultz, North Miami Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 322 days.

(21) Appl. No.: 10/912,598

(22) Filed: Aug. 5, 2004

(65) Prior Publication Data

US 2006/0027080 A1 Feb. 9, 2006

(51) Int. Cl.
*G10H 1/38* (2006.01)
*G10H 7/00* (2006.01)

(52) U.S. Cl. .................. 84/613; 455/567; 84/485 R; 84/609; 84/611; 379/374.01

(58) Field of Classification Search ............... 84/613, 84/611, 609, 485 R; 379/374.01; 455/567, 455/3.06
See application file for complete search history.

(56) References Cited

U.S. PATENT DOCUMENTS

| | | | | |
|---|---|---|---|---|
| 4,257,306 A | * | 3/1981 | Laflamme | 84/485 R |
| 4,412,473 A | * | 11/1983 | Laflamme | 84/485 R |
| 4,519,044 A | * | 5/1985 | Munetsugu | 708/134 |
| 4,866,766 A | | 9/1989 | Mitzlaff | |
| 6,075,998 A | * | 6/2000 | Morishima | 455/567 |
| 6,079,985 A | | 6/2000 | Wohl et al. | |
| 6,501,967 B1 | * | 12/2002 | Makela et al. | 455/567 |
| 6,621,903 B2 | * | 9/2003 | Oda | 379/374.01 |
| 6,707,908 B1 | * | 3/2004 | Nagasawa | 379/374.01 |
| 2001/0047717 A1 | * | 12/2001 | Aoki et al. | 84/611 |
| 2002/0007721 A1 | * | 1/2002 | Aoki | 84/613 |
| 2002/0073827 A1 | | 6/2002 | Gaudet | |
| 2002/0170415 A1 | * | 11/2002 | Hruska et al. | 84/609 |
| 2003/0013497 A1 | * | 1/2003 | Yamaki et al. | 455/567 |
| 2003/0128834 A1 | * | 7/2003 | Laine | 379/374.01 |
| 2004/0176025 A1 | * | 9/2004 | Holm et al. | 455/3.06 |

OTHER PUBLICATIONS

Chordfind, http://www.chordfind.com/guitar, site last visited Aug. 5, 2004.
Sibelius 3 Brochure, www.sibelius.com/3.

* cited by examiner

*Primary Examiner*—Lincoln Donovan
*Assistant Examiner*—Christina Russell (57) ABSTRACT

Within a mobile communication device (100), a method (300) of specifying two or more musical notes for substantially concurrent playback can include receiving (302) an input specifying a root note (FIG. 2) indicating a position on a neck of a stringed instrument and associating (308) at least one column of input keys such as numeric keys (115) of the mobile communication device with a string of the stringed instrument (130). Numeric keys next to one another and within a same column can specify notes which vary by approximately a half-step (130). The method also can include detecting (312) at least one activation of the numeric keys specifying at least one additional note to be played substantially concurrently or in a defined sequence with the root note (FIG. 5), thereby specifying a musical chord.

20 Claims, 6 Drawing Sheets

ENTRY OF MUSICAL DATA IN A MOBILE COMMUNICATION DEVICE

BACKGROUND

1. Field of the Invention

The present invention relates to the field of mobile communication devices and, more particularly, to entering musical data into such devices.

2. Description of the Related Art

The ability to customize and/or personalize a mobile communication device to suit one's own needs and personality has become a significant factor in distinguishing one type of mobile device from another. Many mobile devices, for example mobile phones, messaging devices, or MP3 players, allow users to apply different face plates having different color schemes according to the user's own taste.

Another method of personalizing mobile devices involves the customization of ring tones. Many mobile devices store a variety of different ring tones in memory, allowing the user to choose a preferred or favorite ring tone. Users also can associate distinctive ring tones with different events such as incoming calls, meeting reminders, alarms, and the like. Typically, the available ring tones of a mobile device can be supplemented by downloading additional ring tones from sources such as the Internet.

Still, other varieties of mobile devices allow users to enter or program custom melodies as ring tones. These mobile devices typically allow a user to enter single note melodies. That is, the programmed musical data is not polyphonic. If a device does allow the user to program harmonies, i.e. playing more than one note at the same time, users must program one melody and then layer a second melody. As such, users are prevented from entering harmonic structures such as intervals and/or musical chords in a user-friendly and musical way. Moreover, the interfaces used by such mobile devices lack any resemblance to conventional musical instruments. No existing mobile communication device provides a user-friendly and musical way of entering or programming musical data.

SUMMARY OF THE INVENTION

The present invention provides a method, system, and apparatus for entering musical data into a mobile communication device. In accordance with the inventive arrangements disclosed herein, the various controls of a mobile communication device can be configured to emulate portions of a stringed musical instrument. As such, the embodiments disclosed herein facilitates more intuitive musical data entry by mobile device users that are familiar with the stringed instrument being emulated. More particularly, the embodiments disclosed herein facilitate the entry of chord structures in a more user friendly and musical fashion. Note, a user can also specify the initial tuning position for each string to provide a wider variety of chord possibilities and emulate a wider range of instruments, performers or songs.

One embodiment of the present invention can include a method of specifying musical notes for substantially concurrent playback within a mobile communication device. The method can include receiving an input specifying a root note, wherein the root note indicates a barred position on a neck of a stringed instrument. At least one column of input keys such as numeric keys of the mobile communication device can be associated with a string of the stringed instrument. Input keys positioned next to one another and within a same column can specify notes which vary by approximately a half-step. The method also can include detecting an activation of at least one of the input keys specifying at least one additional note to be played substantially concurrently with the root note, thereby specifying a musical chord.

Other embodiments of the present invention can include a machine readable storage programmed to cause the mobile communication device to perform the various steps disclosed herein as well as a system having means for performing the steps disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
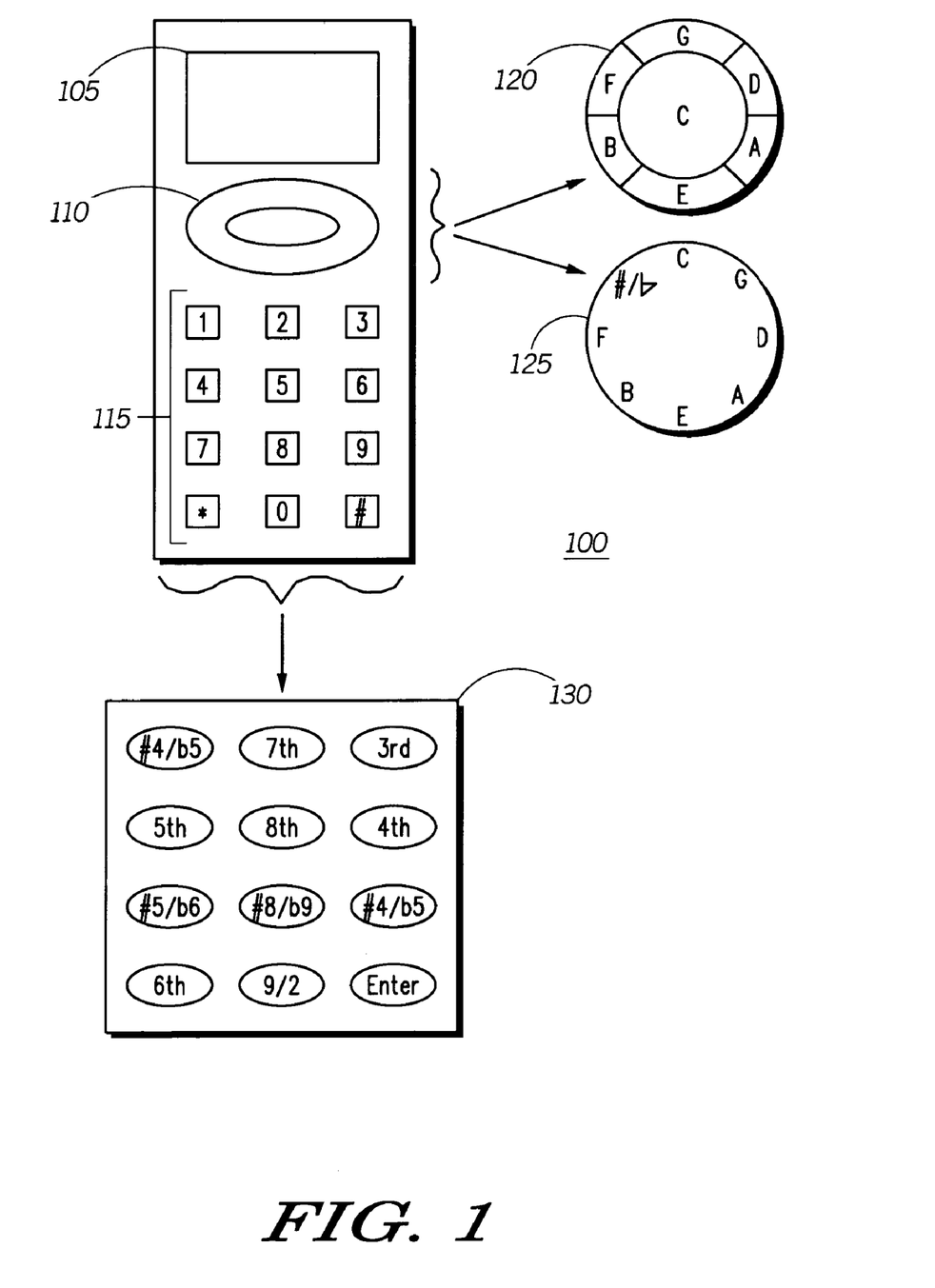
FIG. 1 is a schematic diagram illustrating a mobile communication device and various input mechanisms for entering musical data in accordance with the inventive arrangements disclosed herein.

FIG. 1 is a schematic diagram illustrating a mobile communication device (mobile device) 100 and various input mechanisms for entering musical data in accordance with the inventive arrangements disclosed herein. The mobile device 100 can be implemented as a mobile phone, a pager, a messaging device, an MP3 player, or any of a variety of other wireless communication devices. As such, in addition to circuitry for wireless communications, whether voice and/or data, audio input, and audio output, the mobile device 100 also can include a polyphonic tone generation system or processor, as well as one or more computer programs for performing the various functions described herein.

As shown, the mobile device 100 can include a display screen 105, a multi-position button 110, and a series of input keys such as numeric keys 115. The mobile device 100 can be placed in a musical data entry mode through operation of the multi-position button 110, one or more numeric keys 115, other command and control keys (not shown), or any combination thereof.

Once the mobile device 100 is placed in a musical data entry mode, musical data specifying chord structures can be entered via the controls of the mobile device 100. Any specified chord structures or multi-note combinations can be stored and played back at a later time, for example as a ring tone responsive to an event generated or detected by the mobile device 100, or part of a MIDI sequence to be used as a meeting reminder.

The multi-position button 10 can be assigned particular functions such as designating the root note of a chord. In one embodiment, for example where the multi-position button 110 has 6 directional positions and a center position, each position of the multi-position button 110 can coincide with a note as shown in root note selection scheme 120. In this embodiment, the user can select a root note of a chord and then specify whether the root note will be sharp, flat, or natural by a second or subsequent selection(s) of the same root note or button position. For example, if "D" is selected as the root note, continued selection of "D" can cause the root note to cycle through "D flat", "D sharp", and "D natural". In this manner, a user can specify any possible root note.

In another embodiment, where the multi-position button 10 has 8 positions, each position of the multi-position button 110 can coincide with a note as shown in root note selection scheme 125. In this embodiment, a root can be selected. If the root is to be natural, then root selection is finished. If the root is to be sharp or flat, then selection of the "#/b" position of multi-position button 110 can be selected thereby causing the mobile device 100 to cycle through making the root sharp, flat, and/or natural.

It should be appreciated that the particular position of root notes as correlated with positions of the multi-position button 110 can be varied as necessary. For example, in one embodiment, root notes can be ordered in alphabetical order. In another embodiment, root notes can be ordered in a manner similar or identical to the circle of fifths. Any suitable ordering of root notes can be used. As such, it should be understood that the embodiments disclosed herein are provided for purposes of illustration only and, as such, are not intended to limit the scope of the present invention.

Further, it should be recognized that root note selection can be performed using any of a variety of different buttons and/or controls. That is, other keys of the mobile device 100 can be used to specify a root note. Accordingly, the use of a multi-position button 110 is not to be construed as a limitation of the present invention.

Each of the numeric keys 115 can be associated with a musical note. More particularly, each column of the numeric keys 115 can be associated with a particular string of a stringed instrument. As such, the column of numeric keys 115 containing "1, 4, 7, and *" can represent a particular string. Similarly, column "2, 5, 8, and 0" can represent another string, and column "3, 6, 9, and #" another. The "*" and "#" keys are considered numeric keys for purposes of the inventive arrangements disclosed herein.

Since most western music utilizes half-steps as the smallest musical distance possible between notes, consecutive keys in a column can correspond to half-step musical note distances. Still, the inventive arrangements disclosed herein are not limited by the particular musical intervallic spacing between consecutive numeric keys 115 within a same column.

For example, if the "1" key represents a musical note that is a distance of a diminished $5^{th}$ from a specified root note, then the "4" key can indicate a note that is a distance of a perfect $5^{th}$ from the root. Accordingly, the "1" key and the "4" key correspond to notes separated by a half-step as if located next to one another on an actual string of a stringed instrument such as a guitar.

The first column of numeric keys 115, formed by keys "1, 4, 7, and *", can represent the second to lowest pitched string of a stringed instrument. Each next column can represent adjacent strings of the stringed instrument ascending in pitch. Thus, for example, with reference to a guitar, column "1, 4, 7, and *" can correspond to the $5^{th}$ string, "column "2, 5, 8, and 0" to the $4^{th}$ string, and column "3, 6, 9, and #" can correspond to the $3^{rd}$ string.

Once a root note of a chord is specified, that root note can specify a position on the neck of the stringed instrument as if the root note were to be played using the lowest pitched string. Accordingly, the numeric keys 115 indicate musical notes in relation to the specified root note. The relationship of numeric keys 115 to musical notes allows one to more easily program "bar chords", or those chords where the player of a stringed instrument must use a single finger to bar or play multiple, or all, strings of an instrument at the same time.

In keeping with this scheme, box 130 illustrates the notes that can be associated with the various numeric keys 115 of the mobile device 100 when placed into musical data entry mode. That is, each key indicates a note being a particular distance away from a specified root note. Table 1 below illustrates one manner in which numeric keys 115 can indicate musical notes as illustrated in FIG. 1.

TABLE 1

| Input or Numeric Key | Musical Distance to designated note from root note |
|---|---|
| 1 | Augmented $4^{th}$/Diminished $5^{th}$ |
| 2 | Major $7^{th}$ |
| 3 | Major $3^{rd}$ |
| 4 | Perfect $5^{th}$ |
| 5 | Octave above root note |
| 6 | Octave plus Perfect $4^{th}$ |
| 7 | Augmented $5^{th}$/Minor $6^{th}$ |
| 8 | Augmented $8^{th}$/Minor $9^{th}$ |
| 9 | Octave plus Augmented $4^{th}$/Diminished $5^{th}$ |
| * | Major $6^{th}$ |
| 0 | Major $9^{th}$/Major $2^{nd}$ |

Because the above relationship of musical notes to numeric keys 115 represents that of a bar chord, the strings, as represented by the columns of numeric keys 115, are "barred" or played at the same location of the neck as the root note. Accordingly, if no numeric key 115 is selected in the "1, 4, 7, and *" column, the note specified will default to one that is a perfect $4^{th}$ above the root note. Similarly, if no numeric key 115 is selected in the "2, 5, 8, and 0" column, a note that is an augmented $6^{th}$ or minor $7^{th}$ above the root note is specified and added to the chord. If no numeric key 115 is selected in the "3, 6, 9, #" column, then a note that is an octave and an augmented $2^{nd}$ or minor $3^{rd}$ above the root note is specified as part of the chord.

By assigning numeric keys 115 to musical distances as measured from a specified root note, thereby indicating a particular musical note, a user can more easily specify harmonies, intervals, and/or chord structures. More particularly, one familiar with a stringed instrument can program chords and intervals with relative ease.

Notwithstanding, the embodiments described with reference to FIG. 1 are not intended as a limitation of the present invention. Rather, it should be appreciated that the correspondence of notes or intervals with numeric keys 115 can be fashioned after any of a variety of different stringed instruments, whether guitar, violin, banjo, or the like. As such, the musical distance between adjacent strings and accompanying note layout on each string can change according to the stringed instrument being emulated. Further, as noted, the root note can be specified using any of a variety of different keys, whether multi-positional, numeric, and/or control keys.

Figure 2:
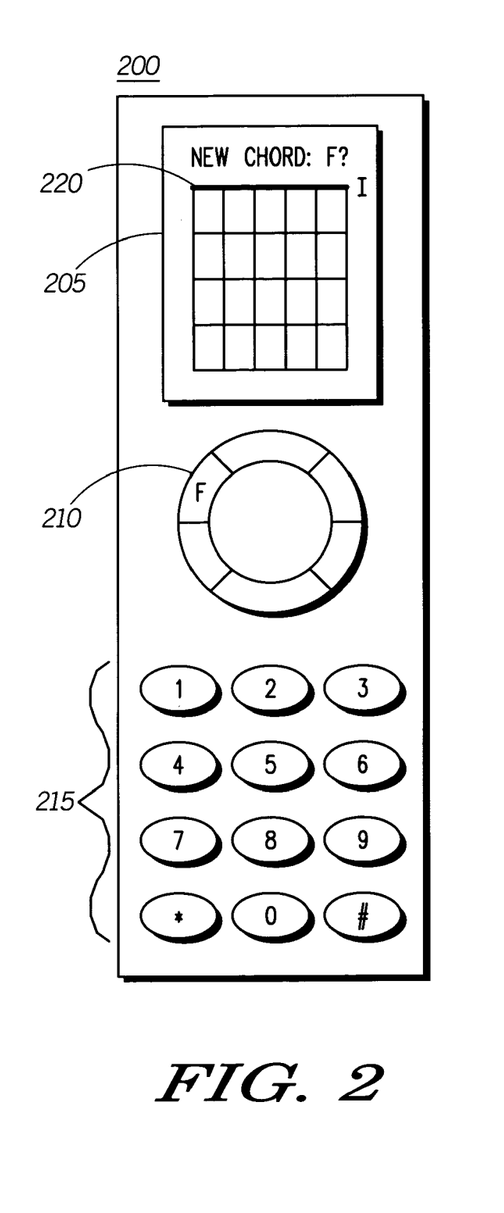
FIGS. 2–8 are pictorial illustrations that, when taken collectively, illustrate a process of entering or programming musical data in accordance with another embodiment of the present invention.

FIGS. 2–8 are pictorial illustrations that, when taken collectively, illustrate a process of entering or programming musical data in accordance with another embodiment of the present invention. As shown in FIG. 2, a mobile device 200 is depicted having a display screen 205, a multi-position button 210, and a plurality of input keys such as numeric keys 215. The mobile device 200 has been placed in a musical data entry mode. As such, a graphical representation of a neck of a stringed instrument is displayed by the display screen 205.

In this embodiment, the stringed instrument can be a guitar. A root note of "F" has been specified using the multi-position button 210. The display screen 205 indicates that "F" has been selected for the root note. Since "F" corresponds to the first position or fret of a guitar, a Roman Numeral "I" has been placed next to the neck representation to indicate that the portion of the neck being displayed begins with the first fret. The first fret corresponds to the dark bar 220, which represents a musician playing or barring all strings at the location of the guitar neck identified by "F", i.e. the first fret. Accordingly, were no other notes to be entered, the resulting chord would be one that includes a note from each string as if the guitar were being barred at the first fret or position. Further note that the root note is normally determined by the $6^{th}$ ("low E") string of the guitar, but the user can shift (horizontally) the root string to define chords based on the $5^{th}$ string or other strings. This would also be reflected by the way the chords are displayed.

Figure 3:
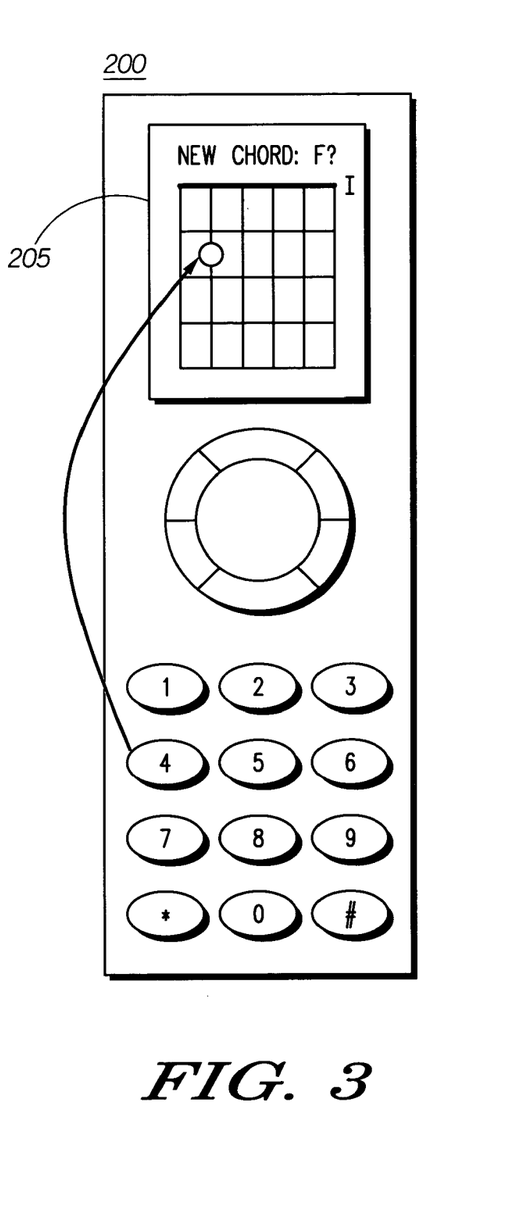

In FIG. 3, the "4" key has been selected indicating that a note on the $5^{th}$ string that is a perfect $5^{th}$ from the root note "F", is to be included as part of a chord being constructed. After the "4" key, is selected, the display screen 205 is updated to indicate the location of the selected note.

Figure 4:
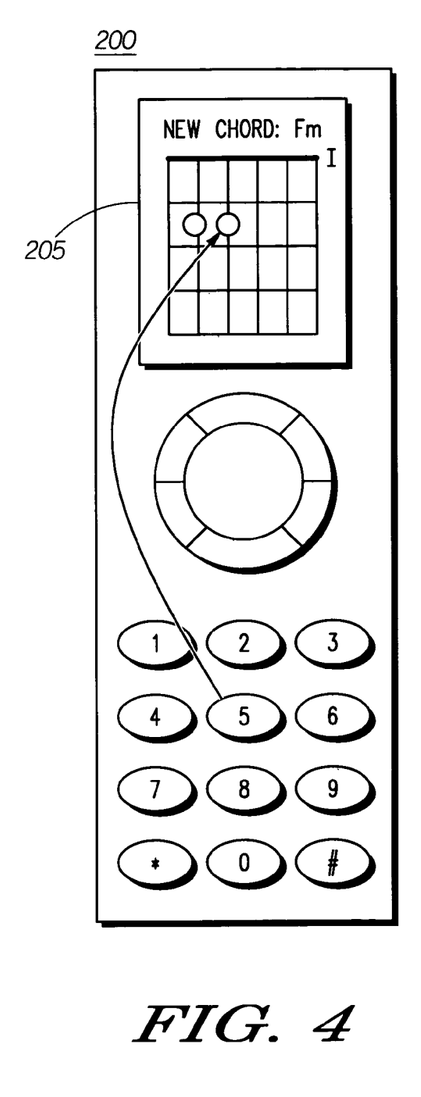

In FIG. 4, the "5" key is pressed indicating that the chord includes a note that is one octave higher than the root note. The name of the chord shown on the display screen 205 is updated to indicate that an F minor chord has been specified thus far. The mobile device 200 can include logic for determining chord names as entered. The selected note, an octave of the root note, is shown on the neck representation of the stringed instrument shown on the display screen 205.

Figure 5:
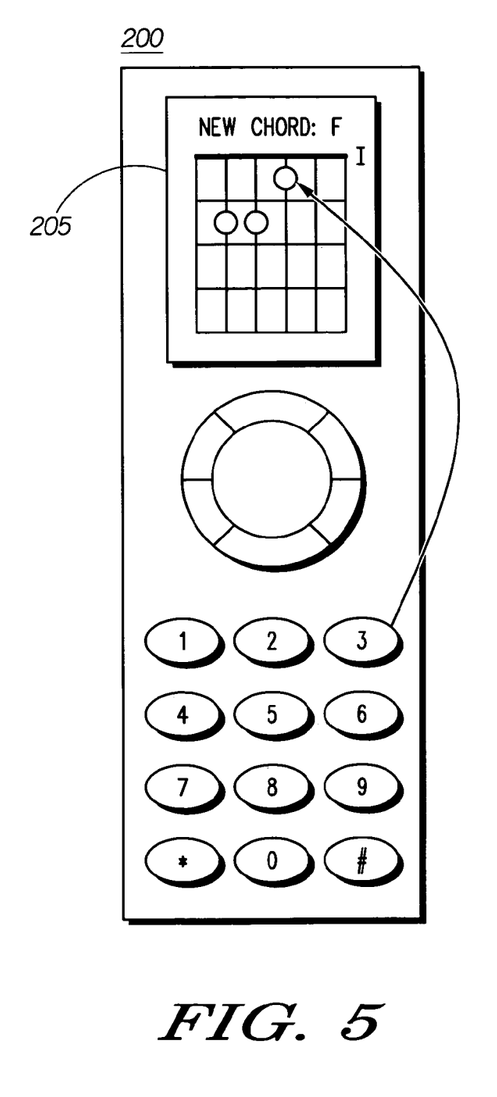

In FIG. 5, the "3" key is pressed indicating that the chord also includes a note which is an octave and a major $3^{rd}$ above the root note. As such, the chord name is updated on display screen 205 to indicate that the chord is an F major chord. Further, the newly added note is indicated upon the neck representation on the display screen 205.

Figures 6, 7:
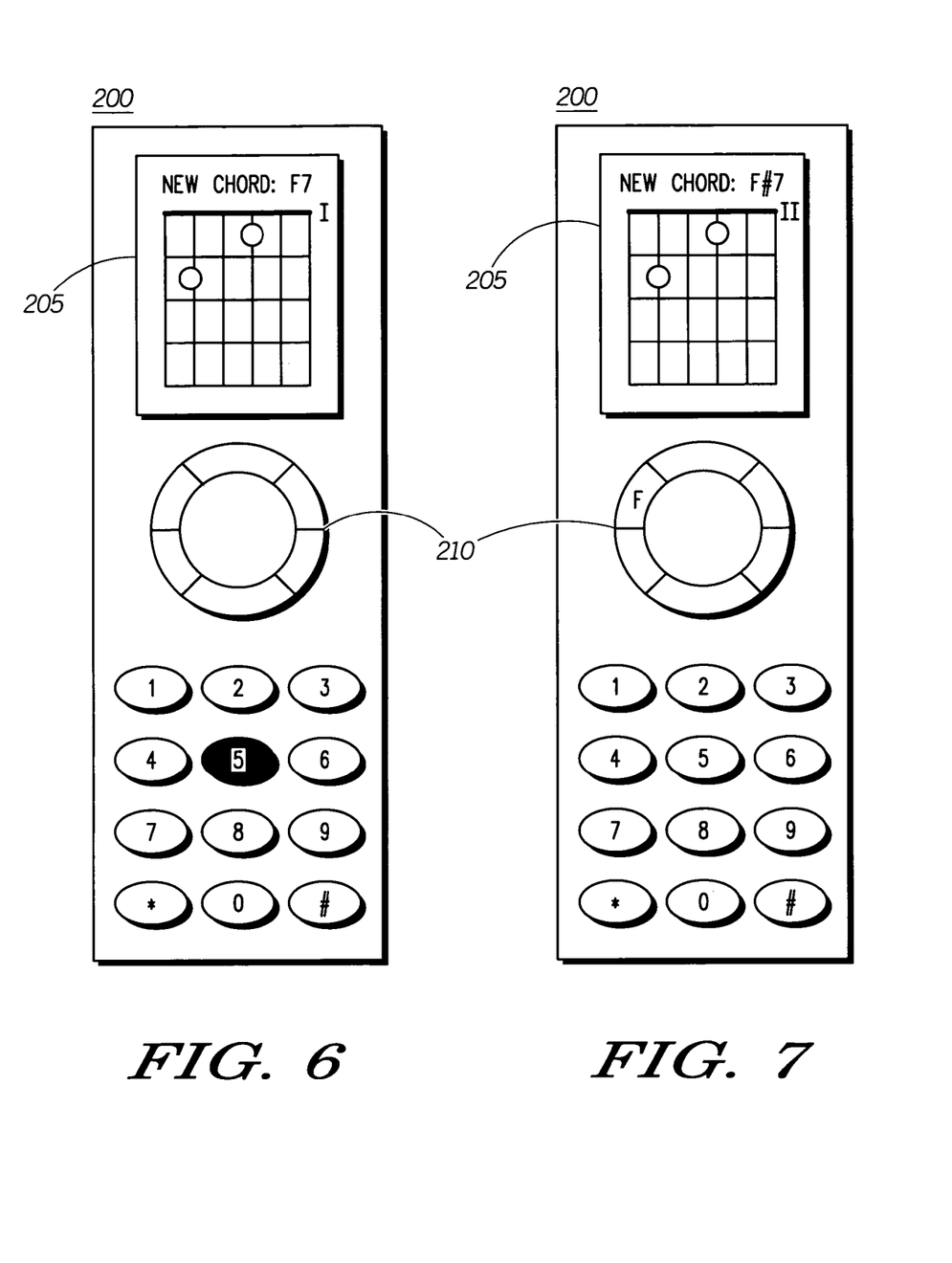

In FIG. 6, the "5" key has been selected again. Selection of a key a second time can function to remove the previously selected note. Accordingly, the octave of the root note "F" has been removed from the display screen 205. With the octave removed, a note which is a minor $7^{th}$ from the root note is now specified as part of the chord being constructed. This is due to the default setting of using notes from the location of the bar as specified by the root note on any string or column where no other note is specified. The note to be played is a half-step below the note indicated by the top note in that column. Accordingly, the name of the chord has been updated to "F7" indicating an F dominant $7^{th}$ chord.

In FIG. 7, the "F" position on the multi-position button 210 has been selected a second time. As noted, selecting the root note a second time can begin cycling through making the root note sharp, flat, or natural. Accordingly, selection of the "F" position a second time renders the root an "F#". Were the "F" position to be selected again, the root note would be rendered an "Fb" or "E", its harmonic equivalent. Selection of the "F" position a third time can render the root an "F" natural. In any case, as the "F" position of the multi-position button 210 was selected a second time, the root note of the chord has been changed to an "F#". Notably, the position indicated on the display screen 205 also has changed to indicate the beginning position of "II". That is, the neck representation presented on the display screen 205 now begins at the second fret. Further, each of the selected notes of the chord have been moved in position, i.e. up a half-step, relative to the new root note. Thus, the distance between each selected note and the original root note is maintained despite moving the root note up a half-step. The updated chord name of "F#7" or F# dominant 7 has been updated as well.

Figure 8:
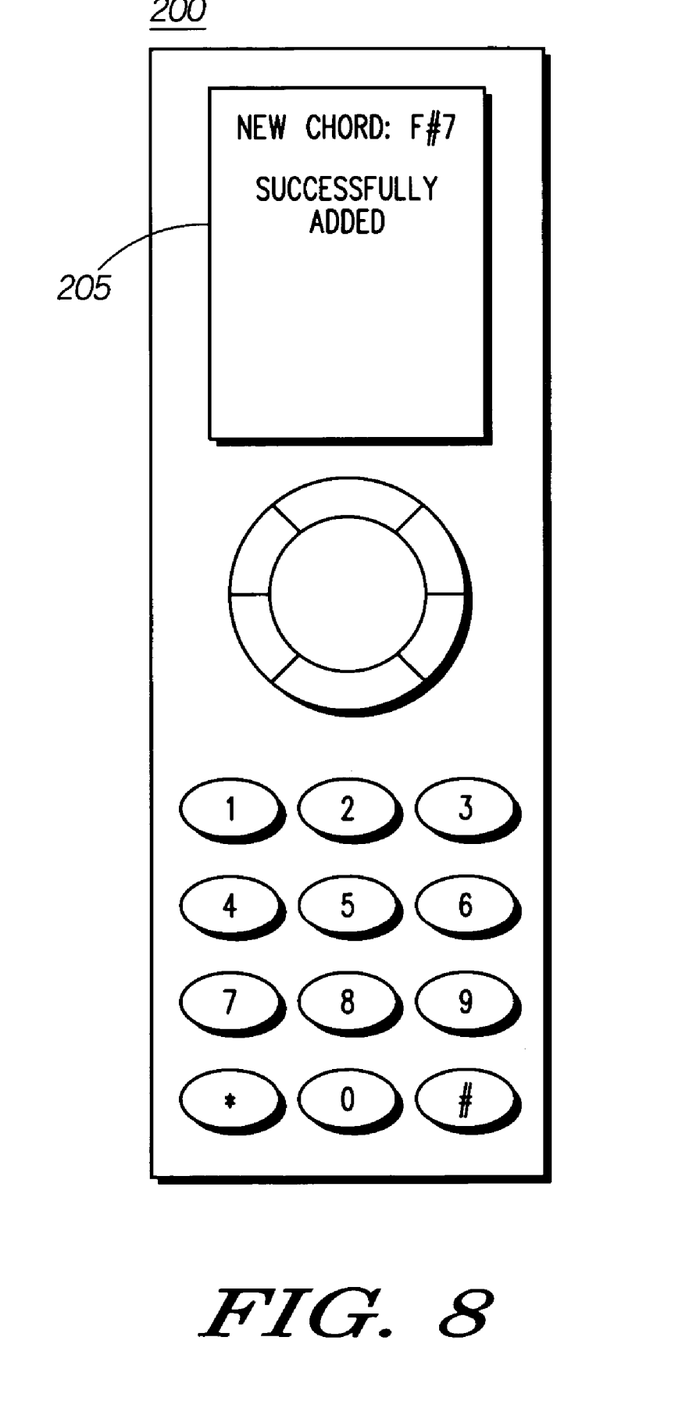

In FIG. 8, the "#" key has been selected. The "#" key can function as an enter key. Thus, once selected, the specified chord can be finalized and stored in memory for playback at a later time. It should be appreciated that the "#" key can be selected at any time to finalize the chord that is presently under construction. Thus, the final chord is an F#7 or F# Dominant 7 chord.

To facilitate faster musical data entry, once a type or musical quality of chord has been specified as described herein, i.e. major $7^{th}$, minor $7^{th}$, dominant $7^{th}$, etc., additional inputs can be received which specify chord progressions. For example, after finalizing a chord, a new root can be entered. The mobile device 200 can automatically format a chord from the newly specified root. The automatically formatted chord can have the same tonal quality as the previous chord. In this manner, a user can quickly enter a I—IV—V or other musical chord progression.

Further, each chord can be edited should the user wish to change the type or quality of chord. Chords entered subsequently using this shorthand approach will have the same tonal quality as the chord entered previously. As noted, selecting a same note in a column removes that note from the chord. Selection of a different note in the same column where another note had already been selected, however, overrides the previous note selection. Further note that chords can be formed in one step by the simultaneous pressing of keys if desired.

Figure 9:
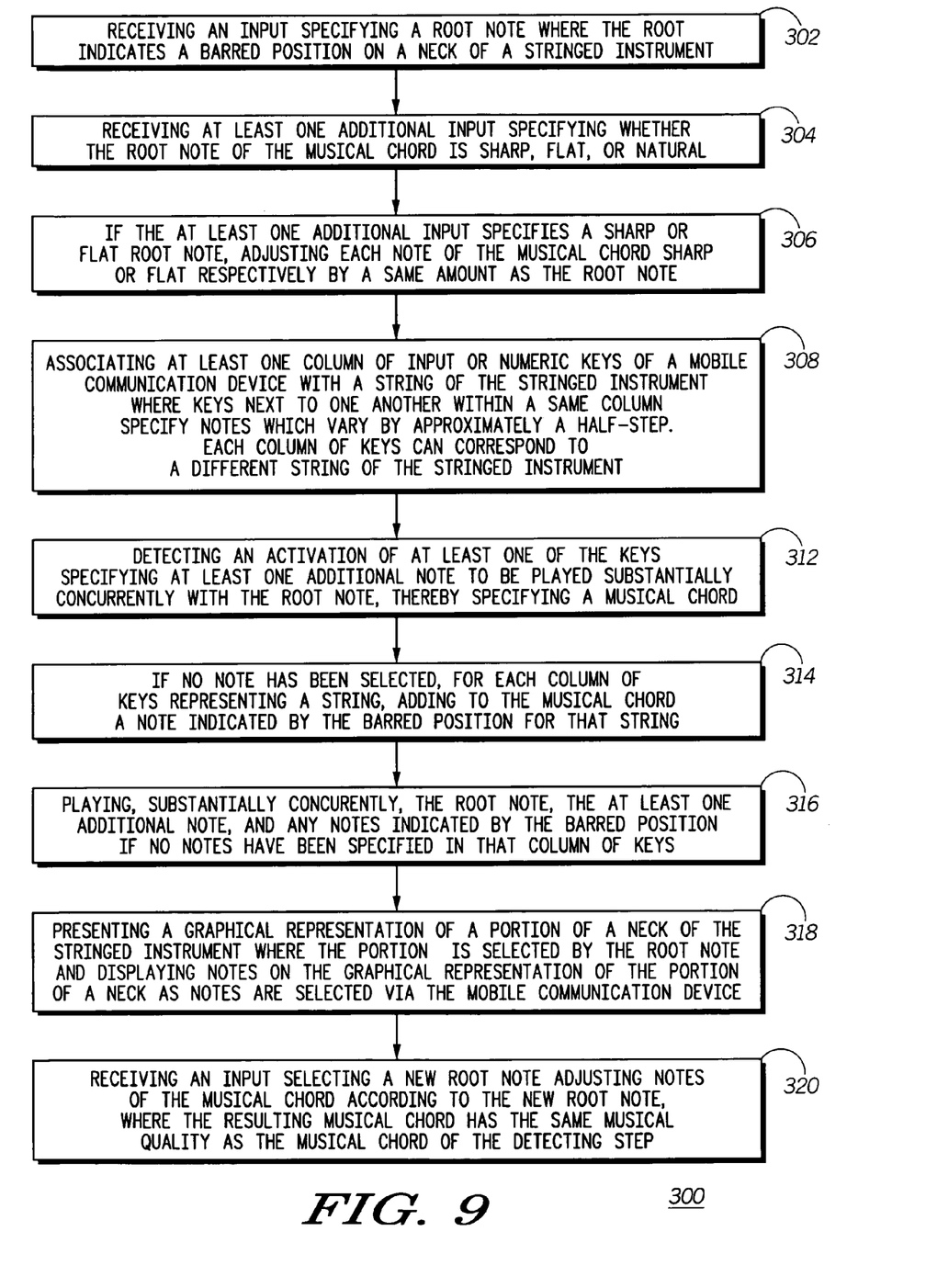
FIG. 9 is a flow chart illustrating a method of specifying musical notes in a mobile communication device in accordance with an embodiment of the present invention.

Referring to FIG. 9, a method 300 of specifying musical notes for substantially concurrent playback within a mobile communication device is shown. The method 300 can include step 302 of receiving an input specifying a root note where the root note indicates a barred position on a neck of a stringed instrument. Optionally, the method can further receive at step 304 at least one additional input specifying whether the root note of the musical chord is sharp, flat, or natural. At step 306, if the at least one additional input specifies a sharp or flat root note, each note of the musical chord is adjusted sharp or flat respectively by a same amount as the root note. The method 300 can further associate at step 308 at least one column of input or numeric keys of a mobile communication device with a string of the stringed instrument where input or numeric keys next to one another within a same column specify notes which vary by approximately a half-step. Note, each column of input or numeric keys can correspond to a different string of the stringed instrument. The method 300 can further detect at step 312 an activation of at least one of the input or numeric keys specifying at least one additional note to be played substantially concurrently with the root note, thereby specifying a musical chord. Note, embodiments in accordance with the present invention can also enable entering a melody (rather than a chord) by specifying and storing individual key-presses for a string. In this instance, pressing a new key on the same or different column adds the note to the melody sequence, as opposed to erasing or replacing the note indicated by a previous key press. At step 314, if no note has been selected (for each column of input or numeric keys representing a string) a note indicated by the barred position for that string can be added to the musical chord. The method 300 can further include the step 316 of playing, substantially concurrently, the root note, the at least one additional note, and any notes indicated by the barred position if no notes have been specified in that column of input or numeric keys. Optionally, since playback is not necessarily all concurrent playback but substantially concurrent, the method can also play the defined chord in an arpeggio format which would enable the playing of notes in the chord in either ascending or descending fashion one at a time including the root note, in sequence or according to a selected pattern of one or more strings as desired. In this regard, the method can include the step of specifying a sequence for playing the root note and any additional notes specified to form the arpeggio or other sequential pattern. For example, R can equal the root, and 1, 2, 3 can indicate the key columns and thus "R 2 3 1" would cause the playing of the root, then the note on the $2^{nd}$ keypad column, then the note on the $3^{rd}$ keypad column, and then the note on the $1^{st}$ keypad column. Optionally, at step 318, a graphical representation can be presented of a portion of a neck of the stringed instrument where the portion is selected by the root note and notes can be displayed on the graphical representation of the portion of a neck as notes are selected via the mobile communication device. The method can further receive at step 320 an input selecting a new root note adjusting notes of the musical chord according to the new root note, where the resulting musical chord has the same musical quality as the musical chord of the detecting step.

The inventive arrangements disclosed herein have been described largely with respect to a guitar. As noted, however, the embodiments described herein can be applied to any of a variety of different stringed instruments. Further, the chords specified can be limited to use only those strings having a correlation to columns of input or numeric keys, or can utilize all strings of the instrument being emulated. Also, although the pitch of a note can be the same as if played on the instrument being emulated, it should be appreciated that notes can be shifted up or down by one or more octaves as may be required according to the limitations of the sound generation system used within the mobile device.

The present invention can be realized in hardware, software, or a combination of hardware and software. Any kind of computer system or other apparatus adapted for carrying out the methods described herein is suited. A typical combination of hardware and software can be a mobile communication device, such as a mobile telephone, with a computer program that, when being loaded and executed, controls the mobile device such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within a mobile communication device, a method of specifying musical notes for substantially concurrent playback comprising:

receiving an input specifying a root note, wherein the root note indicates a barred position on a neck of a stringed instrument;

associating at least one column of input keys of the mobile communication device with a string of the stringed instrument, wherein input keys next to one another within a same column specify notes which vary by approximately a half-step and wherein each column of input keys corresponds to a different string of the stringed instrument; and detecting an activation of at least one of the input keys specifying at least one additional note to be played substantially concurrently with the root note, thereby specifying a musical chord.

2. The method of claim 1, further comprising for each column of input keys representing a string, if no note has been selected, adding to the musical chord a note indicated by the barred position for that string.

3. The method of claim 1, further comprising playing, substantially concurrently, the root note, the at least one additional note, and any notes indicated by the barred position if no notes have been specified in that column of input keys.

4. The method of claim 1, said step of receiving an input further comprising receiving at least one additional input specifying whether the root note of the musical chord is sharp, flat, or natural.

5. The method of claim 4, further comprising, if the at least one additional input specifies a sharp or flat root note, adjusting each note of the musical chord sharp or flat respectively by a same amount as the root note.

6. The method of claim 1, further comprising:

presenting a graphical representation of a portion of a neck of the stringed instrument, wherein the portion is selected by the root note; and displaying notes on the graphical representation of the portion of a neck as notes are selected via the mobile communication device.

7. The method of claim 1, further comprising:

receiving an input selecting a new root note; and adjusting notes of the musical chord according to the new root note, wherein the resulting musical chord has the same musical quality as the musical chord of said detecting step.

8. The method of claim 1, wherein the method further comprises the step of specifying a sequence for playing the root note and the at least one additional note forming the musical chord.

9. A mobile communication device configured to play at least two notes substantially concurrently comprising:

means for receiving an input specifying a root note, wherein the root note indicates a barred position on a neck of a stringed instrument;

means for associating at least one column of input keys of the mobile communication device with a string of the stringed instrument, wherein input keys next to one another within a same column specify notes which vary by approximately a half-step and wherein each column of input keys corresponds to a different string of the stringed instrument; and means for detecting an activation of at least one of the input keys specifying at least one additional note to be played substantially concurrently with the root note, thereby specifying a musical chord.

10. The mobile device claim 9, further comprising, for each column of input keys representing a string, if no note has been selected, means for adding to the musical chord a note indicated by the barred position of that string.

11. The mobile device of claim 9, further comprising means for playing, substantially concurrently, the root note, the at least one additional note, and any notes indicated by the barred position if no notes have been specified in that column of input keys.

12. The mobile communication device of claim 9, said means for receiving an input further comprising means for receiving at least one additional input specifying whether the root note of the musical chord is sharp, flat, or natural.

13. The mobile communication device of claim 12, further comprising means for adjusting each note of the musical chord sharp or flat by a same amount as the root note, when the at least one additional input specifies a sharp or flat root note respectively.

14. The mobile communication device of claim 9, further comprising:
 means for presenting a graphical representation of a portion of a neck of the stringed instrument, wherein the portion is selected by the root note; and
 means for displaying notes on the graphical representation of the portion of a neck as notes are selected via the mobile communication device.

15. The mobile communication device of claim 9, further comprising:
 means for receiving an input selecting a new root note; and
 means for adjusting notes of the musical chord according to the new root note, wherein the resulting musical chord has the same musical quality as the musical chord formed with said means for detecting.

16. A machine readable storage, having stored thereon a computer program having a plurality of code sections executable by a mobile communication device for causing the device to perform the steps of:
 receiving an input specifying a root note, wherein the root note indicates a barred position on a neck of a stringed instrument;
 associating at least one column of input keys of the mobile communication device with a string of the stringed instrument, wherein input keys next to one another within a same column specify notes which vary by approximately a half-step and wherein each column of input keys corresponds to a different string of the stringed instrument; and
 detecting an activation of at least one of the input keys specifying at least one additional note to be played substantially concurrently with the root note, thereby specifying a musical chord.

17. The machine readable storage of claim 16, further comprising for each column of input keys representing a string, if no note has been selected, adding to the musical chord a note indicated by the barred position for that string.

18. The machine readable storage of claim 16, said step of receiving an input further comprising:
 receiving at least one additional input specifying whether the root note of the musical chord is sharp, flat, or natural; and
 if the at least one additional input specifies a sharp or flat root note, adjusting each note of the musical chord sharp or flat respectively by a same amount as the root note.

19. The machine readable storage of claim 16, further comprising:
 presenting a graphical representation of a portion of a neck of the stringed instrument, wherein the portion is selected by the root note; and
 displaying notes on the graphical representation of the portion of a neck as notes are selected via the mobile communication device.

20. The machine readable storage of claim 16, further comprising:
 receiving an input selecting a new root note; and
 adjusting notes of the musical chord according to the new root note, wherein the resulting musical chord has the same musical quality as the musical chord of said detecting step.

* * * * *